(12) United States Patent
Khandkar et al.

(10) Patent No.: US 8,993,989 B1
(45) Date of Patent: Mar. 31, 2015

(54) APPARATUSES AND METHODS EMPLOYING MULTIPLE LAYERS FOR ATTENUATING IONIZING RADIATION

(71) Applicant: BLOXR Solutions, LLC, Salt Lake City, UT (US)

(72) Inventors: Ashok C. Khandkar, Salt Lake City, UT (US); Prataprai Chowdhary, Taylorsville, UT (US)

(73) Assignee: BLOXR Solutions, LLC, Salt Lake City, UT (US)

( * ) Notice: Subject to any disclaimer, the term of this patent is extended or adjusted under 35 U.S.C. 154(b) by 0 days.

(21) Appl. No.: 14/305,887

(22) Filed: Jun. 16, 2014

Related U.S. Application Data

(63) Continuation of application No. 13/710,172, filed on Dec. 10, 2012, now Pat. No. 8,754,389, which is a continuation-in-part of application No. 13/663,467, filed on Oct. 29, 2012, and a continuation-in-part of application No. 12/897,611, filed on Oct. 4, 2010, which is a continuation-in-part of application No. 12/683,727, filed on Jan. 7, 2010.

(51) Int. Cl.
*G21F 1/12* (2006.01)

(52) U.S. Cl.
CPC ........................................ *G21F 1/12* (2013.01)
USPC .................................... 250/515.1; 250/505.1

(58) Field of Classification Search
CPC .............. G21F 1/00; G21F 1/02; G21F 1/08; G21F 1/10; G21F 1/12; G21F 3/00; G21F 3/04
USPC ...................... 250/505.1, 515.1, 518.1, 519.1
See application file for complete search history.

(56) References Cited

U.S. PATENT DOCUMENTS

| | | | |
|---|---|---|---|
| 1,331,018 A | 2/1920 | Luthy | |
| 3,200,085 A | 8/1965 | Guglielmo | |
| 4,938,233 A | 7/1990 | Orrison, Jr. | |
| 5,001,354 A | 3/1991 | Gould et al. | |
| 5,059,807 A | 10/1991 | Kersten et al. | |

(Continued)

FOREIGN PATENT DOCUMENTS

| | | |
|---|---|---|
| EP | 2058821 | 5/2009 |
| GB | 1491202 | 11/1977 |

(Continued)

OTHER PUBLICATIONS

U.S. Appl. No. 14/225,633, filed Mar. 26, 2014, Khandkar.

(Continued)

*Primary Examiner* — Nicole Ippolito
(74) *Attorney, Agent, or Firm* — Stoel Rives LLP

(57) ABSTRACT

Radiation shields and radiation shielding systems for attenuating ionizing radiation include two or more attenuating elements, such as layers. The two or more attenuating elements may include different attenuating materials. The two or more attenuating elements may be configured to attenuate ionizing radiation differently than one another. In some embodiments, different attenuating elements may be configured for use with different energies or ranges of energies of ionizing radiation. The concurrent use of two or more layers or other attenuating elements may optimize the ability of a radiation shield to attenuating ionizing radiation. Systems and methods for attenuating ionizing radiation are also disclosed.

20 Claims, 7 Drawing Sheets

(56) References Cited

U.S. PATENT DOCUMENTS

| | | |
|---|---|---|
| 5,245,195 A | 9/1993 | Shah et al. |
| 5,548,125 A | 8/1996 | Sandbank |
| 6,232,383 B1 | 5/2001 | Joseph |
| 6,281,515 B1 | 8/2001 | Demeo et al. |
| 6,459,091 B1 | 10/2002 | Demeo et al. |
| 6,472,476 B1 | 10/2002 | Soane et al. |
| 6,517,933 B1 | 2/2003 | Soane et al. |
| 6,544,594 B2 | 4/2003 | Linford et al. |
| 6,674,087 B2 | 1/2004 | Cadwalader et al. |
| 6,855,772 B2 | 2/2005 | Linford et al. |
| 7,340,308 B1 | 3/2008 | Clopton et al. |
| 7,449,194 B2 | 11/2008 | Lelah et al. |
| 7,449,705 B2 | 11/2008 | Eder |
| 7,659,439 B2 | 2/2010 | Grossman |
| 8,067,758 B2 | 11/2011 | Popa-Simil et al. |
| 8,754,389 B2 * | 6/2014 | Khandkar et al. ......... 250/515.1 |
| 2001/0022965 A1 | 9/2001 | Heger et al. |
| 2003/0010939 A1 | 1/2003 | Demeo et al. |
| 2003/0095935 A1 | 5/2003 | Chaiyawat et al. |
| 2004/0001894 A1 | 1/2004 | Leibowitz |
| 2004/0004196 A1 | 1/2004 | Demeo et al. |
| 2004/0041107 A1 | 3/2004 | Cadwalader et al. |
| 2004/0124374 A1 | 7/2004 | Joseph |
| 2005/0211930 A1 | 9/2005 | Demeo et al. |
| 2005/0256439 A1 | 11/2005 | Grossman |
| 2006/0038140 A1 | 2/2006 | Grilliot et al. |
| 2006/0151750 A1 | 7/2006 | Eder |
| 2006/0210500 A1 | 9/2006 | Bicard-Benhamou et al. |
| 2007/0075277 A1 | 4/2007 | Smith et al. |
| 2008/0128658 A1 | 6/2008 | Jungerman et al. |
| 2008/0128660 A1 * | 6/2008 | Thiess et al. ................. 252/478 |
| 2008/0164425 A1 | 7/2008 | Cadwalader et al. |
| 2008/0182093 A1 | 7/2008 | Sonntag et al. |
| 2008/0249594 A1 | 10/2008 | Dietrich et al. |
| 2008/0272318 A1 | 11/2008 | Cadwalader et al. |
| 2008/0296541 A1 | 12/2008 | Hamilton et al. |
| 2009/0027921 A1 | 1/2009 | Chou et al. |
| 2009/0198007 A1 | 8/2009 | Wang |
| 2009/0272921 A1 * | 11/2009 | Ballsieper ................. 250/515.1 |
| 2010/0163758 A1 | 7/2010 | Kirschenbaum |
| 2010/0176317 A1 | 7/2010 | Smith |
| 2010/0186753 A1 | 7/2010 | Buckley |
| 2011/0163248 A1 | 7/2011 | Beck |
| 2011/0165269 A1 | 7/2011 | Khandkar |
| 2011/0165373 A1 | 7/2011 | Khandkar |
| 2012/0248346 A1 | 10/2012 | Chowdhary et al. |
| 2013/0079862 A1 | 3/2013 | Ellrich |
| 2013/0240763 A1 | 9/2013 | Khandkar et al. |
| 2014/0021377 A1 | 1/2014 | Khandkar et al. |
| 2014/0151584 A1 | 6/2014 | Khandkar et al. |
| 2014/0205860 A1 | 7/2014 | Khandkar |

FOREIGN PATENT DOCUMENTS

| | | |
|---|---|---|
| JP | 2007217361 | 8/2007 |
| JP | 2008-189576 | 8/2008 |
| WO | WO2005049713 | 6/2005 |
| WO | WO2011085273 | 7/2011 |
| WO | WO2012138565 | 10/2012 |

OTHER PUBLICATIONS

U.S. Appl. No. 14/228,633, filed Mar. 28, 2014, Khandkar.
Extended European Search Report dated Aug. 23, 2013 for EP11732251.1.
International Search Report dated Mar. 11, 2011 for PCT/US2011/020608.
Office Action dated Mar. 14, 2014 for U.S. Appl. No. 12/897,611.
Kiran, Lead Equivalence Test Procedure, Mar. 2014.
International Search Report dated Jul. 20, 2012 for PCT/US2012/031489.
Wu et al., 'Realizing Visible-Light-Induced Self-Cleaning Property of Cotton through Coating N-TiO2 Film and Loading Agl Particles', ACS Appl. Mater. Interfaces, 2011, 3(12). pp. 4770-4774.
Office Action dated Jun. 13, 2013 for U.S. Appl. No. 13/683,727.
Office Action dated Dec. 31, 2013 for U.S. Appl. No. 13/683,727.
Restriction Requirement dated Jan. 25, 2013 for U.S. Appl. No. 12/897,611.
Office Action dated Jul. 15, 2013 for U.S. Appl. No. 12/897,611.
Office Action dated May 16, 2013 for U.S. Appl. No. 13/710,172.
Office Action dated Aug. 26, 2013 for U.S. Appl. No. 13/710,172.
Office Action dated Jan. 15, 2014 for U.S. Appl. No. 13/710,172.
Office Action dated Mar. 7, 2014 for U.S. Appl. No. 13/436,344.
McCaffrey et al., 'Optimizing Non-Pb Radiation Shielding Materials Using Bilayers', Med Phys 36(12), Dec. 2009.
McCaffrey et al., 'Radiation Shielding Materials and Radiation Scatter Effects for Interventional Radiology (IR) Physicians', Med Phys 39(7), Jul. 2012.
Office Action dated Jun. 4, 2014 for U.S. Appl. No. 13/663,467.
Office Action dated Jun. 30, 2014 for U.S. Appl. No. 13/421,961.
Office Action dated Jul. 7, 2014 for U.S. Appl. No. 12/897,611.

* cited by examiner

APPARATUSES AND METHODS EMPLOYING MULTIPLE LAYERS FOR ATTENUATING IONIZING RADIATION

CROSS-REFERENCE TO RELATED APPLICATIONS

This application is a continuation of now pending U.S. patent application Ser. No. 13/710,172, filed on Dec. 10, 2012 and titled "APPARATUSES AND METHODS EMPLOYING MULTIPLE LAYERS FOR ATTENUATING IONIZING RADIATION" ("the '172 Application"), which is a continuation-in-part of U.S. patent application Ser. No. 13/663,467, filed on Oct. 29, 2012 and titled "NUCLEAR RADIATION SHIELDS, SHIELDING SYSTEMS AND ASSOCIATED METHODS" ("the '467 Application"), and a continuation-in-part of U.S. patent application Ser. No. 12/897,611, filed on Oct. 4, 2010 and titled "RADIO-OPAQUE FILMS OF LAMINATE CONSTRUCTION" ("the '611 Application"), which is a continuation-in-part of U.S. patent application Ser. No. 12/683,727, filed on Jan. 7, 2010 and titled "RADIATION PROTECTION SYSTEM" ("the '727 Application"), each of which is incorporated herein by reference in its entirety.

TECHNICAL FIELD

This disclosure relates generally to the attenuation of ionizing radiation and, more specifically, to compositions, structures and methods for attenuating ionizing radiation. More specifically, this disclosure relates to the use of multiple layers of materials for attenuating ionizing radiation and, even more specifically, to the concurrent use of multiple layers that attenuate different energies of the spectrum of ionizing radiation together to limit a subject's exposure to ionizing radiation.

RELATED ART

Ionizing radiation includes particles (e.g., neutrons, electrons, positrons, neutrinos, photons, etc.) that individually carry enough energy to liberate an electron from an atom or a molecule, ionizing the atom or molecule. Examples of ionizing radiation include, but are not limited to, neutrons travelling at any speed, alpha rays, beta rays, gamma rays and x-rays. When living tissues are exposed to high doses of ionizing radiation over a relatively short period of time, the ionizing radiation is likely to cause damage to those tissues. There are a number of environments in which individuals may be exposed to the potentially harmful effects of ionizing radiation.

Physicians and allied clinical personnel, collectively referred to as "healthcare providers," are commonly involved in medical procedures on patients in which fluoroscopic and other types of radiation systems (such as computer tomography, or CT, systems) are used. These radiation systems allow the healthcare providers to peer into the body systems of a patient and view a portion of the anatomy of a subject (e.g., a patient, an individual, etc.) with minimal invasiveness. The images generated may be in the form of a single image, or a video feed, both of which may be viewed in real-time. Radiation systems enable diagnosis, as well as the guidance of medical devices, such as catheters and surgical devices, to desired locations within the body of a subject and, in some cases, use of the medical devices at the desired locations.

One of the concerns arising from the increased use of fluoroscopic radiation systems in medical procedures is the amount of radiation exposure to both healthcare providers and patients. Epidemiological data suggest that exposure to as "little" as 5 rem to 10 rem over an individual's lifetime increases the risk that the individual will develop cancer. Literature also suggests that there is no lower threshold on the amount of radiation that could be considered acceptable. Further, studies have shown that elevated radiation exposure levels can be expected when larger body parts of a subject are imaged, or when parts of a healthcare provider's body, such as his or her extremities, are positioned closer to the source of ionizing radiation or directly in the field of ionizing radiation (as opposed to scattered ionizing radiation outside of the field).

While there is constant debate about levels of ionizing radiation to which a subject may be exposed before suffering tissue damage, and these levels are occasionally revised as more information is gathered, the cumulative effects of consistent exposure to ionizing radiation are still unknown. That is, while the selected dose of radiation used in any one imaging sequence may normally be well below an exposure limit that is considered to be safe, repeated exposure of healthcare providers and/or patients to even low levels of ionizing radiation may be cumulatively unsafe. Recent investigations in medical diagnostics practices suggest that the dose and exposure of an individual to ionizing radiation should follow the "As Low As Reasonable" approach. For instance, members of the surgical team using fluoroscopic imaging techniques may be unnecessarily exposed to x-rays when performing surgery on a patient. As an example, in diagnostic procedures using x-rays or computed tomography (CT) scans, a radiologist may have to hold a patient such as an infant, or an animal in the case of veterinary work, to restrain the movement of the patient in order to obtain satisfactory image resolution. In these cases, at a minimum, the hands of the radiologist or other healthcare providers may be exposed to harmful ionizing radiation. Additionally, repeated exposure across multiple procedures on one or more patients may also increase the risk of radiation exposure to the healthcare providers.

Healthcare providers are not the only ones in healthcare settings who may be subjected to high levels of ionizing radiation over time. The exposure of patients to ionizing radiation is also ever-increasing, as the use of ionizing radiation in healthcare becomes more common. For example, mobile C-arm image intensifiers, as fluoroscopic imaging systems, are increasingly used in operating rooms, outpatient clinics, and emergency departments to image larger, denser areas of a subject's body (e.g., the pelvis, the spine, etc.). Images are taken during both non-elective surgical procedures and elective surgical procedures, and often result in the exposure of nontargeted tissues (e.g., bones; muscles; other, more sensitive visceral organs; etc.) to ionizing radiation. Further, the number of times to which a subject will be exposed to ionizing radiation during his or her lifetime has increased, resulting in higher accumulated doses, which increases the risk of harm to the subject.

In an effort to minimize exposure to potentially harmful ionizing radiation in healthcare settings, lead aprons are used, when possible, to protect both healthcare providers and patients. A lead apron effectively prevents ionizing radiation incident to an outside of the apron from passing through to and exiting the inside of the apron and, as such, protects whatever is on the inside of the apron from the ionizing radiation. For instance, when imaging a targeted body part of a patient, one or more lead aprons may be arranged on one or more non-targeted body parts of the patient to enable a targeted body part to be exposed to ionizing radiation while minimizing exposure of each covered, non-targeted body part to the ionizing radiation. As another example, healthcare providers may wear lead aprons to protect themselves from the ionizing radiation to which they subject their patients. Nevertheless, lead aprons are typically heavy and, to enable healthcare providers to freely use their arms and hands to conduct medical procedures, are usually not configured to cover arms or hands; thus, lead aprons usually provide only limited protection from ionizing radiation.

In recognition of the desirability for additional protection, gloves that attenuate ionizing radiation have been developed. Conventionally, such radiation attenuating gloves have included a heavy metal (e.g., lead (Pb), cadmium (Cd), tungsten (W), bismuth (Bi), etc.) or a heavy metal compound, such as bismuth oxide. Some radiation attenuating gloves are made of a flexible polymer through which the heavy metal or heavy metal compound is dispersed. Alternatively, a flexible glove may be dipped into a mixture containing a heavy metal or heavy metal compound. Although these gloves block ionizing radiation, they expose a wearer to toxic heavy metals. Furthermore, heavy metal-based gloves that attenuate ionizing radiation are typically cumbersome and inflexible, which may restrict agile hand movements that may be necessary for delicate procedures and reduce dexterity and the tactile sensation upon which healthcare providers often rely as a secondary source of information while viewing images obtained with the ionizing radiation (e.g., while guiding medical instruments, as fingers or hands are inside of a patient or otherwise hidden from direct view, etc.). Heavy metal-based gloves that attenuate ionizing radiation may also be prone to breaking or tearing, as heavy metals are often incorporated in concentrations that may compromise the tear resistance of the glove. When such a glove is broken or torn, the individual wearing the glove is exposed to ionizing radiation, and to even further amounts of the toxic heavy metals that are used to make the glove. Unfortunately, healthcare providers do not typically wear radiation attenuating gloves. As a result, a healthcare provider's hands and arms may be cumulatively subjected to unacceptably high levels of ionizing radiation.

Ionizing radiation is also common in environments where radioactive materials are typically present, such as in nuclear power facilities or nuclear recycling or waste facilities. Because of likelihood that individuals who work in such environments will be exposed to ionizing radiation, they are typically required to carry dosimeters. A dosimeter measures the quantity of nuclear radiation, or radioactivity, to which an individual is exposed. Knowledge of an individual's exposure to nuclear radiation is important, particularly in environments where individuals are not provided with protective suits or other protective garments and since governmental and/or private regulations often limit the dosage of nuclear radiation to which an individual may be exposed over a given period of time. Typically, the maximum annual dosage of radiation for individuals who routinely work around radioactive materials and other types of ionizing radiation is 5,000 millirems (mrem).

Radiation blankets are often used to limit an individual's exposure to nuclear radiation in environments where relatively high levels of radioactivity are present. More specifically, one or more radiation blankets may be positioned over areas where exposure to nuclear radiation is most likely. The use of radiation blankets is intended to decrease the cumulative dosage of nuclear radiation to which an individual is exposed, as measured by a dosimeter used by the individual. Thus, when radiation blankets and other radiation shields are properly used, the total amount of time each individual may work in that environment over a given period of time may be increased, which may reduce employee downtime and, thus, improve worker efficiency.

Radiation blankets are often formed from a single material such as lead plate or lead wool. Another form of a radiation blanket made from a single attenuating material is in the form of a polymer that is impregnated with particles of tungsten, iron ore, some combination of tungsten and iron ore, heavy metals, or heavy metal compounds. Lead plate is typically dense and provides an effective barrier to the ionizing particles of nuclear radiation, or radioactivity, emitted by radioactive materials. Although lead is flexible for a metal, lead plate is still relatively rigid and somewhat brittle and, thus, subject to cracking and/or breaking. Lead wool, in contrast, includes fine strands of lead (e.g., strands having diameters of 0.005 inch to 0.015 inch) of varying lengths that are woven, or interlaced, with one another and pressed together, or compacted. While lead wool is much less dense that lead plate, it is much more flexible. Nonetheless, the flexibility of compacted lead wool is still limited, and lead wool is very friable, easily subject to cracking or breakage and unraveling of the compacted lead strands. Such cracking may lead to gaps in radiation protection, resulting in leakage of harmful radiation. Further, broken particles and strands of lead settle to the bottom of the blanket over time, leading to non-uniform attenuation across the surface of the blanket, which may then require users to add extra shielding, in turn leading to higher stresses on structures and potentially requiring costly modifications of shielded structures. Tungsten or iron based radiation blankets are more flexible and less susceptible to cracking or damage than lead wool radiation blankets. However, these radiation blankets are often relatively thick and, as a result, lack a desirable degree of flexibility. Furthermore, over time, particularly when exposed to high temperatures and nuclear radiation, the polymer of tungsten-based radiation blankets hardens, which may render it less flexible and more prone to cracking. Another problem associated with employing a single material such as tungsten or iron ore for attenuating radiation is that such materials release additional photons by themselves due to the photoelectric effect.

Regardless of the construction of a radiation blanket, cracks or breaks in its radioactivity-attenuating materials provide additional passages through which ionizing particles may pass. Furthermore, since the blanket is made from a toxic material such as lead, after use, the radiation blanket becomes a mixed waste, or waste that contaminated with both radioactivity and toxic materials, regardless of whether the blanket was intact or cracked or broken. In view of the toxicity of lead, its release from a radiation blanket is considered to be highly undesirable and requires prohibitively expensive remedial actions.

As a radiation blanket that employs a single attenuating material, such as lead or tungsten, attenuates nuclear radiation, the photo-electric effect may cause that attenuating material to generate additional photons. Since these additional photons may also be harmful, the ability of radiation blankets that rely on a single material to attenuate radioactivity and, thus, to minimize the doses of radioactivity or other ionizing radiation to which personnel may be exposed may be less than ideal.

SUMMARY

A "radiation shield," as that term is used herein, is a film, coating, layer or other structure that includes one or more attenuating elements. An "attenuating element" is a feature of a radiation shield that includes an attenuating material. An "attenuating material" is a material that attenuates ionizing radiation, or a so-called "radio-opaque material." "Ionizing radiation" is radiation composed of particles (e.g., neutrons, electrons, positrons, neutrinos, photons, etc.) that individually carry enough to liberate an electron from an atom or a molecule, ionizing the atom or molecule. Examples of ionizing radiation include, but are not limited to, neutrons travelling at any speed, alpha rays, beta rays, gamma rays and x-rays.

The term "multiple," as used in this disclosure, refers to two or more occurrences of an element. Thus, the phrase "multiple attenuating elements" is indicative of two or more attenuating elements. Similarly, the phrase "multiple layers" signifies two or more layers.

A radiation shield according to this disclosure includes two or more attenuating elements that may be organized in a manner that increases the efficiency with which ionizing radiation is attenuated and, in some embodiments, minimizes one or more of the weight or thickness of the radiation shield or improves the flexibility of the radiation shield. The attenuating materials that different attenuating elements include may be based upon elemental species having different atomic numbers. Two or more attenuating elements of a radiation shield may attenuate ionizing radiation of different energies or different ranges of energy.

The radiation shield may include a first side, or an outside, and an opposite second side, or inside. The outside of the radiation shield may be configured to be positioned closest to, or to face, a source of ionizing radiation, while the inside of the radiation shield may be configured to face away from the source of ionizing radiation, and to be positioned closest to one or more subjects or objects that are to be shielded from the ionizing radiation. In such an embodiment, an attenuating element at or near the outside of the radiation shield may be configured to attenuate relatively high energy ionizing radiation, while an attenuating element at or nearer to the inside of the radiation shield may be configured to lower energy ionizing radiation, which may result from attenuation of the relatively high energy ionizing radiation, and which may be more damaging to living tissues than the relatively high energy ionizing radiation. In more specific embodiments, a first attenuating element located closer to the outside of the radiation shield may comprise a relatively low atomic number, or "low Z," attenuating material, while a second attenuating element located closer to the inside of the radiation shield may comprise a relatively high atomic number, or "high Z," attenuating material.

A radiation shield may be configured to be assembled with and secured to one or more other radiation shields to provide a radiation shield with a larger area. In some embodiments, features that enable a radiation shield to be assembled with and secured to another radiation shield may also be configured to enable disassembly of the radiation shields. A variety of means for assembly may be employed, including, without limitation, quick-connect latches, complementary hook and loop elements (e.g., VELCRO®, etc.), magnets and/or magnetically attractable elements, snaps, zippers, adhesive elements, and the like.

In a specific embodiment, the attenuating elements of a radiation shield may comprise two or more superimposed layers, each of which includes an attenuating material. In embodiments where a radiation shield includes more than two attenuating layers, the layers may be arranged progressively; for example, based on the atomic numbers of the elements upon which their attenuating materials are based, based on the energies of ionizing radiation that they will attenuate, etc. Alternatively, the attenuating layers of a radiation shield may be arranged in a repetitive, alternating order (e.g., A, B, A, B, . . . ; A, B, C, A, B, C, . . . ; A, A, A, B, B, B, . . . ; etc.).

Any of the foregoing teachings may be applied to a variety of embodiments of radiation shields. Without limitation, a radiation shield may include a structure (e.g., a garment, drape, blanket, etc.) that includes a two or more superimposed layers, a plurality of films resulting from separately applied topical compositions, a combination of different single layer and/or multiple layer attenuating elements (e.g., a film, layer or structure including a first attenuating material and at least one other film, layer or structure including a second attenuating material, etc.).

A method for attenuating ionizing radiation includes positioning a shield between a source of ionizing radiation and a subject to be shielded from the ionizing radiation. The shield is positioned in such a way that a first attenuating element that includes a first attenuating material is located nearer to the source of ionizing radiation and a second attenuating element that includes a second attenuating material is located nearer to the subject to be shielded. In such an arrangement, the first attenuating material may be based an element that has a lower atomic number (i.e., a relatively low Z material) than the atomic number of an element upon which the second attenuating material is based (i.e., a relatively high Z material).

Other aspects, as well as features and advantages of various aspects, of the disclosed subject matter will become apparent to those of ordinary skill in the art through consideration of the ensuing description, the accompanying drawings and the appended claims.

BRIEF DESCRIPTION OF THE DRAWINGS

In the drawings:

FIG. 1 an embodiment of a manner in which attenuating materials that comprise or are based on elements or elemental species with relatively low atomic numbers, or low Z materials, and attenuating materials that comprise or are based on elements or elemental species with relatively high atomic numbers, or high Z materials, may be used together to attenuate both incident and secondary ionizing radiation;

DETAILED DESCRIPTION

A variety of embodiments of radiation shields that include multiple attenuating elements are within the scope of this disclosure.

Figure 1:
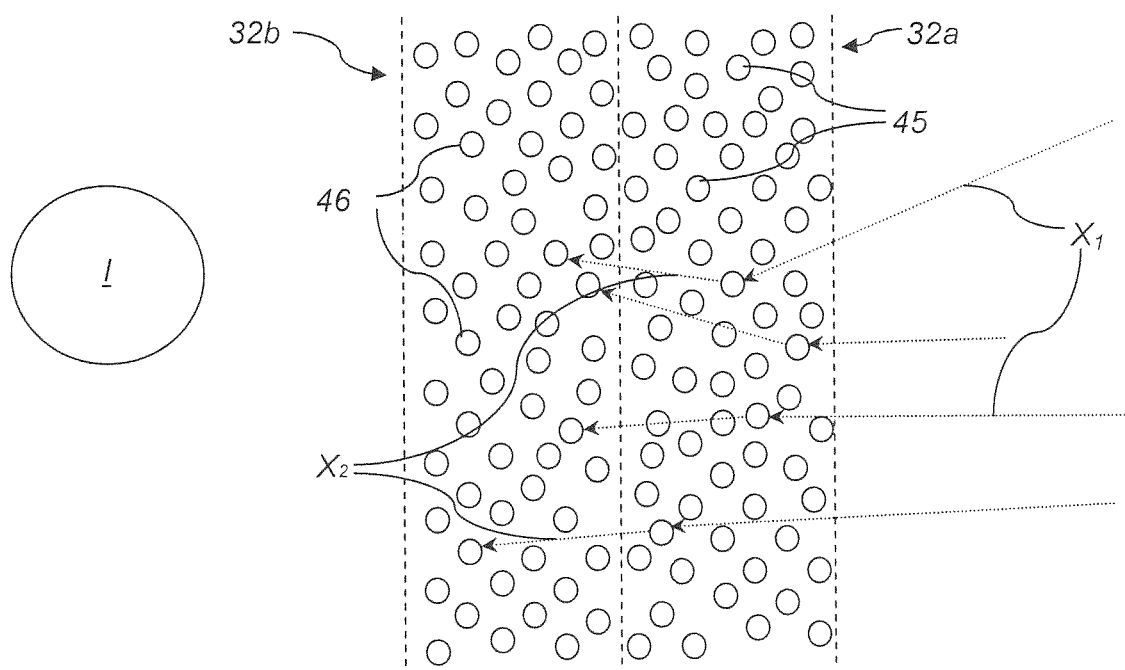
FIG. 1 provides a schematic representation of an embodiment of radiation shield that includes two or more attenuation element, which are depicted as layers.

In some embodiments, such as that depicted by FIG. 1, a radiation shield 30 may include attenuating elements 32a and 32b (collectively, "attenuating elements 32"), such as the depicted layers or other structures (e.g., coatings, stratified structures, graded structures, etc.) that have different properties from one another. The attenuating elements 32 of such an embodiment may be arranged in any order. For example, the attenuating elements 32 may be arranged vertically relative to one another (i.e., in at least partially superimposed relation), in a more horizontal manner (i.e., laterally adjacent to one another) (e.g., in matrices, into quasi-random structures, into random structures, etc.) or in a combination of vertical and horizontal relations.

In some implementations, the order and/or positioning of (e.g., spacing between, etc.) attenuating elements 32 that have different physical characteristics from one another may be designed or configured to impart the radiation shield 30 with one or more desired characteristics. As an example, attenuating elements 32 with different properties may be arranged in a way that increases the range or ranges of energies of ionizing radiation that may be attenuated by the radiation shield 30. Each attenuating element 32a that includes a first type of attenuating material may be configured to attenuate ionizing radiation of a first energy or a first range of energies, while each attenuating element 32b that includes a second type of attenuating material may be configured to attenuate ionizing radiation of a second energy or a second range of energies. More specifically, each attenuating element 32a that includes the first type of attenuating material may be configured to attenuate relatively high energy ionizing radiation, while each attenuating element 32b that includes the second type of attenuating material may be configured to attenuate relatively low energy ionizing radiation. Depending on the source of ionizing radiation, the energy spectrum and/or other factors, other arrangements may be utilized, including, without limitation, a reverse configuration to that disclosed by this paragraph.

As a more specific example, the attenuating elements 32 may be arranged in a manner that attenuates incident ionizing radiation, as well as lower energy, secondary ionizing radiation that may result from attenuation of the incident ionizing radiation. In a specific embodiment, the attenuating elements 32a and 32b of a radiation shield 30 may have at least two different ionizing radiation-attenuating characteristics. In an even more specific embodiment, the radiation shield 30 may include attenuating elements 32a and 32b with two different ionizing radiation-attenuating characteristics. The attenuating elements 32a and 32b may be organized so that the atomic number(s) of the element(s) or elemental specie(s) upon which the attenuating material of each attenuating element 32a, 32b, etc., is based may increase across the thickness of the radiation shield 30; i.e., each attenuating element 32a may comprise a relatively low Z material, while each attenuating element 32b may comprise a relatively high Z material.

A radiation shield 30 that includes an attenuating element 32a with a relatively low Z attenuating material and another attenuating element 32b with a relatively high Z attenuating material may be used in a manner that optimizes the attenuation of radiation, such as nuclear radiation or other ionizing particles. As an example, when a radiation shield 30 that includes one or more attenuating elements 32a of relatively low Z attenuating material 45 and one or more attenuating elements 32b of relatively high Z attenuating material 46 is used to decrease the amount of radiation present at a particular location, as illustrated by FIG. 1, the radiation shield 30 may be positioned between a source S of radioactivity in an orientation that places at least one attenuating element 32a including the relatively low Z attenuating material 45 closer to the source S than at least one attenuating element 32b that includes the relatively high Z attenuating material 46.

When incident ionizing radiation $X_1$ passes through the attenuating element 32a that includes the relatively low Z attenuating material 45, the relatively low Z attenuating material 45 absorbs and, thus, attenuates at least some of the incident ionizing radiation $X_1$. As the low Z attenuating material 45 absorbs the incident ionizing radiation $X_1$, the atoms, or elemental species, of the relatively low Z attenuating material 45 may be excited to a state that causes them to release further, secondary ionizing radiation $X_2$. The secondary ionizing radiation $X_2$ may have a lower energy than the incident ionizing radiation $X_1$. As a consequence, the relatively low Z attenuating material 45 of attenuating element 32a may not attenuate the secondary ionizing radiation $X_2$ as well as it attenuates the incident ionizing radiation $X_1$, if it attenuates the secondary ionizing radiation $X_2$ at all. Moreover, the relatively low energy secondary ionizing radiation $X_2$ is more likely than the incident ionizing radiation $X_1$ to be absorbed by the tissues of an individual's body and, thus, be more damaging to the individual. Nevertheless, before that secondary ionizing radiation $X_2$ can reach the individual, it must pass through at least one attenuating element 32b that includes a relatively high Z attenuating material 46, which includes ionizing radiation-attenuating species that may attenuate the secondary ionizing radiation $X_2$ better than the relatively low Z attenuating material 45 of layer 32a. Thus, the relatively high Z attenuating material 46 of attenuating element 32b may reduce the amount of secondary ionizing radiation $X_2$ that reaches the individual, if not totally prevent exposure of the individual to the secondary ionizing radiation $X_2$.

Figure 2:
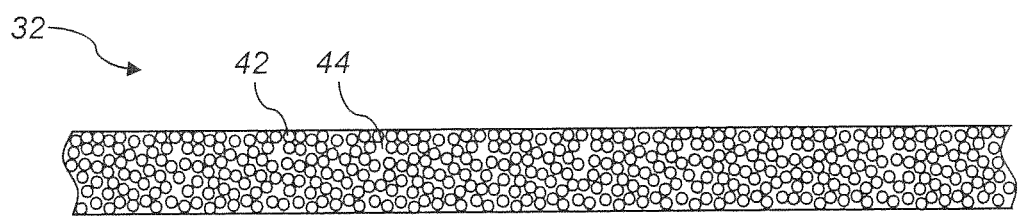
FIGS. 2 though 5 depict various embodiments of the manner in which the attenuation elements of a radiation shield with multiple attenuation elements may be organized.
Figure 3:
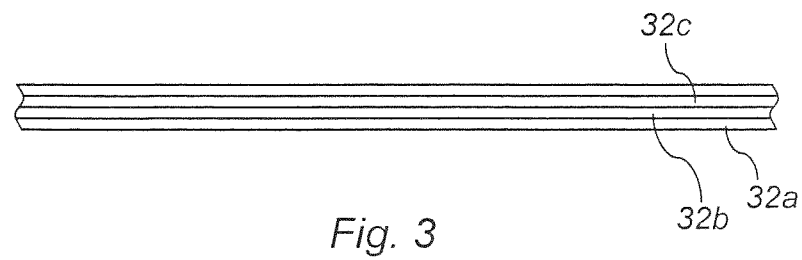
Figure 4:
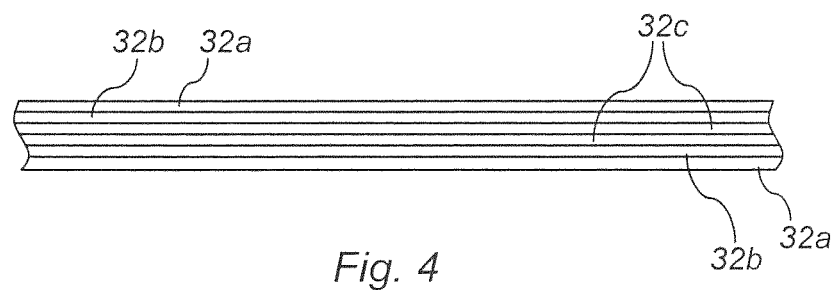

FIGS. 2 through 4 depict embodiments of radiation shields 30', 30" and 30'", respectively, that include more than two layers, or attenuating elements 32a, 32b, etc. The radiation shield 30' shown in FIG. 2 includes attenuating elements 32a, 32b, 32c, etc., with one or more characteristics that differ from one attenuating element 32 to another. The attenuating elements 32a, 32b, 32c, etc.) are arranged in such a way that at least one characteristic progresses from one side 38' of the radiation shield 30' to the opposite side 39' of the radiation shield 30'. As a non-limiting example, the attenuating elements 32 may be arranged in an order that corresponds to an atomic number of an elemental species upon which an attenuating material of each attenuating element 32 is based. As another non-limiting example, the order in which the attenuating elements 32 are arranged may be based on an energy of ionizing radiation attenuated by each of the attenuating elements 32. Of course, other bases for progressively arranging the attenuating elements 32 of a radiation shield 30' are also within the scope of this disclosure.

As depicted by FIG. 3, a radiation shield 30" may also include attenuating elements 32 that are arranged in an alternating, repetitive manner. In the embodiment depicted by FIG. 3, the radiation shield 30" includes two different types of radiation shields 32a and 32b, which are repetitively arranged from one side 38" of the radiation shield 30" to the opposite side 39" of the radiation shield 30" (i.e., 32a, 32b, 32a, 32b, etc.).

FIG. 4 illustrates an embodiment of radiation shield 30" in which attenuating elements 32a, 32b, 32c are organized progressively from one side 38 of a radiation shield to an internal location 37 within the radiation shield 30 in a first manner (e.g., 32a, 32b, 32c, etc.), then progressively in an opposite, second manner (e.g., 32c, 32b, 32a) from the internal location 37 to the opposite side 39 of the radiation shield 30'.

Of course, other arrangements of attenuating elements 32 in a radiation shield 30 are also within the scope of the disclosed subject matter, including, without limitation, random arrangements and pseudo-random (i.e., non-progressive, non-repetitive, etc.) arrangements.

Figure 5:
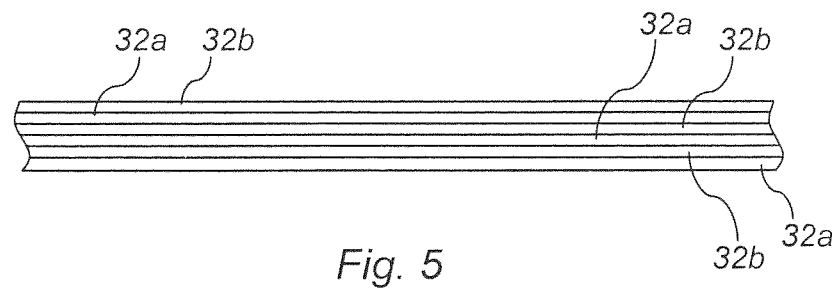

In some embodiments, as illustrated by FIG. 5, a radiation shield 30" may include two or more different types of attenuating elements 32, but include two or more directly adjacent attenuating elements 32a, 32b of the same type. In the depicted embodiment, first and second attenuating elements 32a and 32a' comprise the same attenuating material, while a third attenuating element 32b comprises a different attenuating material. This concept of adjacent attenuating elements 32 of the same type may be applied to any other arrangement of attenuating elements 32, including progressive, repetitive and pseudo-random arrangements.

With returned referenced to FIG. 1, the foregoing teachings may be applied to a variety of different types of radiation shields 30. A variety of materials and structures may also be used to form one or more of the attenuating elements 32 of a radiation shield 30.

An attenuating element 32 of a radiation shield 30 may be formed from any material that will attenuate ionizing radiation in the desired manner. Without limitation, the attenuating material of the attenuating element 32 may comprise a non-toxic material that comprises or is based upon an element or elemental species or compound having an atomic number of 56 or greater. Non-limiting examples of such elements or elemental species include barium (Ba) species, bismuth (Bi) species and lanthanum (La) species. Specific examples of such inorganic salts include, but are not limited to, barium sulfate ($BaSO_4$) and bismuth oxide ($Bi_2O_3$).

Non-limiting examples of attenuating elements 32 include layers, films (e.g., films formed by different topical compositions, such as those disclosed by the '611 Application and the '727 Application, etc.), foils, interlocking panels, strands, mesh, threads, fabrics, mesh, webs, tubes, pipes, or other structures. In some embodiments, one or more attenuating elements 32 of a radiation shield 30 may include particles of an attenuating material that are held together by or dispersed throughout a polymer.

Figure 6:
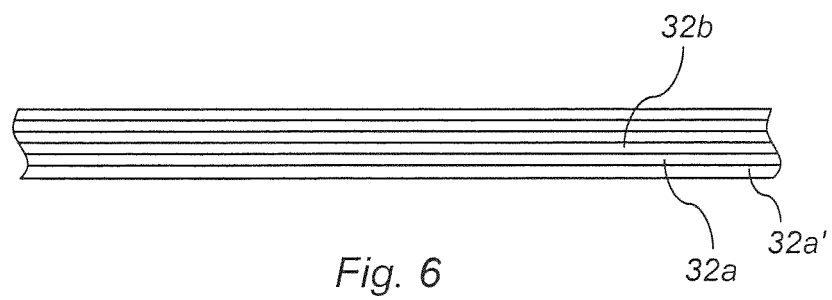
FIG. 6 provides a cross-sectional representation of an embodiment of attenuating element, which may comprise a layer or film.

In a specific embodiment, one or more attenuating elements 32 of a radiation shield 30 may comprise layers having the construction disclosed by the '467 Application. As depicted by FIG. 6, such an attenuating element 32 may include particles 42 of an attenuating material that are held together by or dispersed throughout a polymer 44. A number of factors, such as the type(s) of polymer(s) used, the size(s) and/or morphologies of the particles 42 of the attenuating material(s), the relative proportions of the attenuating material(s) and the polymer(s), and/or the thickness of the attenuating element 32, may affect the flexibility, durability, and/or other characteristics of the attenuating element 32. While FIG. 6 shows an attenuating element 32 throughout which the particles 42 of attenuating material are dispersed homogeneously or substantially homogeneously, attenuating elements with non-homogeneous particle 42 distributions (e.g., gradients, random distributions, etc.) are also within the scope of this disclosure.

Without limiting the possible scope of materials, proportions, characteristics and other features of an attenuating element 32 of a radiation shield 30, the polymer 44 may comprise a flexible polymer. The polymer 44 may comprise a material that retains its flexibility when exposed to heat and/or ionizing radiation, and may retain its flexibility when exposed to heat and/or ionizing radiation repeatedly or for prolonged periods of time. In some embodiments, the particles 42 of attenuating material may be held together with the polymer 44. In embodiments where the attenuating element 32 includes a sufficient amount of the polymer 44, the particles 42 of attenuating material may be dispersed throughout the polymer 44.

Also without limitation, the particles 42 of attenuating material of the layer 32 may comprise a non-toxic material that comprises or is based upon an element or elemental species or compound having an atomic number of 56 or greater.

The attenuating element 32 may have a percent solids loading (by weight) that imparts it with a desired distribution, a desired particle 42 density and, thus, while also considering the thickness of the attenuating element 32, with the ability to attenuate nuclear radiation or other ionizing radiation by a desired amount, or extent. While virtually any percent solids loading that will impart the attenuating element 32 with desired properties may be used (e.g., at least 50%, by weight, at least 70%, by weight, etc.), in some embodiments, the percent solids loading of the attenuating element 32 may be eighty percent (80%), by weight, to about ninety percent (90%), by weight.

In one example, with continued reference to FIG. 6 and renewed reference to FIG. 1, a radiation shield 30 may include an attenuating element 32a that comprises a layer formed by a polymer 44 throughout which particles 42 of a relatively high z material are dispersed and another attenuating element 32b that comprises a layer formed by a polymer 44 throughout which particles 42 of a relatively low z material are dispersed. The polymer 44 of the attenuating element 32a may comprise vinyl, while the particles 42 of the attenuating element 32a may be formed from barium sulfate, and the percent solids loading of particles 42 of the attenuating element 32a may be about eighty percent (80%), by weight, to about eighty-two percent (82%), by weight. The attenuating element 32b may also include a vinyl polymer 44, throughout which particles 42 of bismuth oxide are dispersed in a percent solids loading of about eighty-five percent (85%), by weight, to about eighty-seven percent (87%), by weight. Such attenuating elements 32a and 32b may have thicknesses (or average thicknesses) of about 0.6 mm.

Figure 7:
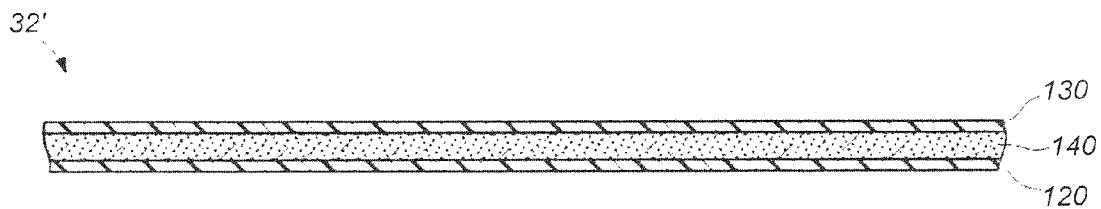
FIGS. 7 through 9 are cross-sectional representations of other embodiments of attenuating elements that may be configured as layers or films.
Figure 8:
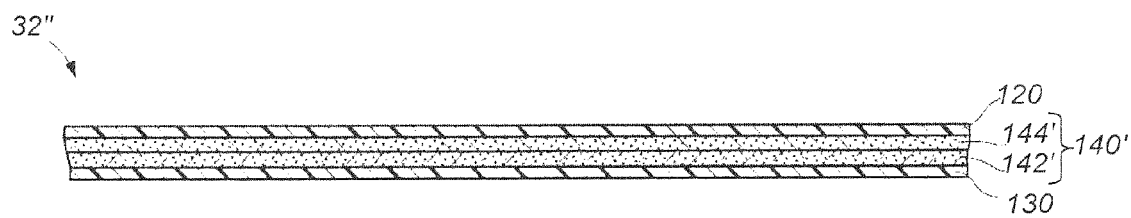
Figure 9:
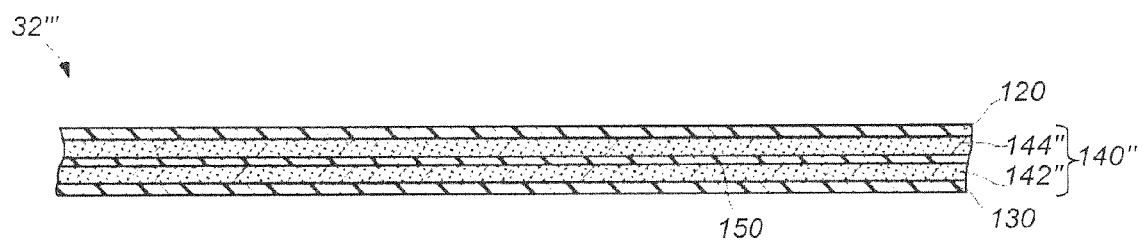

FIGS. 7 through 9 illustrate other embodiments of attenuating elements 32 that may be used in a radiation shield 30 according to this disclosure.

In FIG. 7, an embodiment of attenuating element 32' is depicted that includes a radio-opaque layer 140 sandwiched between a pair of containment layers 120 and 130. Each containment layer 120, 130 may comprise a thin, flexible film. The material of each containment layer 120, 130 may conform somewhat to the shape of an object, such as the body part of a patient, over which a radio-opaque film 10 that includes the containment layers 120 and 130 is positioned. In some embodiments, the containment layers 120 and 130 may be configured in such a way as to enable folding of the radio-opaque film of which they are a part.

In some embodiments, one or both containment layers 120 and 130 may include at least one surface with features, such as patterned or random texturing, that increase its effective surface area and/or enhance adhesion between that containment layer 120, 130 and the adjacent radio-opaque layer 140.

By way of example, and not by way of limitation, each containment layer 120 and 130 may have a thickness of about 15 mils (0.015 inch, or about 0.375 mm) or less. Of course, embodiments of radio-opaque films 10 that include containment layers 120, 130 of other thicknesses are also within the scope of the present invention.

A variety of different materials are suitable for use as containment layers 120, 130, including, without limitation, polymers, papers, ceramic based materials and fabrics. The material used as each containment layer 120, 130 may be selected on the basis of a number of factors, including, without limitation, temperature resistance, abrasion resistance, ability to withstand contact with oils, the porosity of the material, water-resistance (which may be a function of porosity, the material itself, etc.), bacterial resistance (which may be a function of porosity, incorporation of antibacterial agents into the material, etc.), flexibility, feel and any other factors. In some embodiments, each containment layer 120, 130 may comprise a polymer or a polymer-based material. More specifically, one or both containment layers 120, 130 may comprise a polymer film or a sheet of woven or non woven polymer fibers with paper-like or fabric-like characteristics. In other embodiments, one or both containment layers 120, 130 may comprise a polymer, but have a structure (e.g., fibers arranged in a way) that resembles paper (e.g., for use as a surgical drape, etc.) or fabric (e.g., for use in a gown, etc.).

In some embodiments, one or both of the containment layers may have some opacity to ionizing radiation, or radio-opacity.

The radio-opaque layer 140 of the attenuating element 32' may include an attenuating material that may, in some embodiments, be in a particulate or powdered form. In such embodiments, the radio-opaque layer 140 may include a binder that holds particles of the radio-opaque material together.

Without limitation, the attenuating material of the radio-opaque layer 140 may comprise a non-toxic material that comprises or is based upon an element or elemental species or compound having an atomic number of 56 or greater. Non-limiting examples of such elements or elemental species include barium (Ba) species, bismuth (Bi) species and lanthanum (La) species. Specific examples of such inorganic salts include, but are not limited to, barium sulfate ($BaSO_4$) and bismuth oxide ($Bi_2O_3$).

In embodiments where the radio-opaque layer 140 includes a binder, any material that will hold particles of the radio-opaque material together without causing a substantial decrease in the density of the radio-opaque material may be used as the binder. The binder may hold particles of radio-opaque material together loosely, it may provide a stronger bond between adjacent particles, and/or it may enable the formation of a smooth uniform coating, or film. Examples of such materials include, but are not limited to, polyvinyl alcohol (PVA), polyvinyl butyrol (PVB), polyvinyl chloride (PVC), polyethylene glycol (PEG), silicones, polyurethanes and combinations of any of these materials.

In a radio-opaque layer 140 with particles of radio-opaque material held together with a binder, the radio-opaque material may, in some embodiments, comprise at least about 50% of the weight of the radio-opaque layer 140, with the binder comprising about 50% or less of the weight of the radio-opaque layer 140. Other embodiments of radio-opaque layers 140 include about 75% or more of the radio-opaque material, by weight, and about 25% or less of the binder, by weight. In still other embodiments, the radio-opaque material may comprise about 97% or more of the weight of the radio-opaque layer 140, while the binder comprises only up to about 3% of the weight of the radio-opaque layer 140.

In some embodiments, a radio-opaque layer 140 of an attenuating element 32' has a thickness of about 40 mils (0.040 inch, or 1 mm) or less. In other embodiments, an attenuating element 32' may include a radio-opaque layer 140 with a thickness of about 25 mils (0.020 inch, or about 0.6 mm) or less. In still other embodiments, the radio-opaque layer 140 of an attenuating element 32' may have a thickness of about 15 mils (0.015 inch, or about 0.375 mm) or less, about 10 mils (0.010 inch, or about 0.25 mm) or less, or about 5 mils (0.005 inch, or about 0.125 mm) or less.

The ability of the radio-opaque layer 140 to attenuate ionizing radiation depends upon a number of factors, including, without limitation, the attenuating ability of each radio-opaque material from which the radio-opaque layer 140 is formed, the relative amounts of radio-opaque material and binder in the radio-opaque layer 140, and the thickness of the radio-opaque layer 140.

The containment layers 120 and 130 may be secured to the radio-opaque layer 40, and to one another, in a number of different ways. As an example, in embodiments where the radio-opaque layer 140 includes a particulate or powdered radio-opaque material and a binder, the binder may adhere or otherwise secure the containment layers 120 and 130 to the radio-opaque layer 140 and, thus, to one another. In other embodiments, the containment layers 120 and 130 may be directly or indirectly seemed to one another at a plurality of spaced apart locations (e.g., in a matrix of spaced apart points, a grid of spaced apart row lines and column lines, etc.) with the radio-opaque layer 140 occupying substantially all other areas (i.e., substantially all of the area) between the containment layers 120 and 130. For example, the containment layers 120 and 130 may be directly fused to one another (e.g., by thermal bonding, solvent bonding, etc.). As another example, adhesive material may be disposed between a plurality of spaced apart locations on the containment layers 120 and 130.

Known processes may be used to manufacture an attenuating element 32'. In some embodiments, the radio-opaque material and binder may substantially homogeneously mixed in a solvent. The solvent may comprise a carrier solvent within which the binder is provided, or a separately added solvent. In more specific embodiments, the resulting slurry may have a solids content, or solids loading, of about 75% w/w to about 80% w/w. The slurry may then be applied to one of the containment layers 120 in a manner that will result in the formation of a thin film of radio-opaque material over the containment layer 120. In specific embodiments, a doctor blade or simulated doctor blade technique may be employed to form the radio-opaque layer 140. In other embodiments one or more rollers may be employed to form and disperse the radio-opaque layer 140 between the containment layers 120 and 130. The other containment layer 130 may then be applied over the radio-opaque layer 140. In a specific embodiment suitable for mass production, roll calendaring techniques may be used.

Turning now to FIG. 8, another embodiment of attenuating element 32" is shown. Like the attenuating element 32' depicted by FIG. 7, attenuating element 32" includes a pair of oppositely facing containment layers 120 and 130 with a radio-opaque layer 140' between the containment layers 120 and 130. Radio-opaque layer 140' differs from radio-opaque layer 140, however, in that radio-opaque layer 140' includes two (as depicted) or more sublayers 142', 144', etc. Each sublayer 142', 144', etc., includes a different radio-opaque material or mixture of radio-opaque materials than each adjacent sublayer 144', 142', etc. In some embodiments, each sublayer (e.g., sublayer 142') may be based upon an elemental species (e.g., barium, bismuth, lanthanum, etc.) with an atomic number that is less than the atomic number of the elemental species of the radio-opaque material upon which the next successive sublayer (e.g., sublayer 144') is based. By way of non-limiting example, sublayer 142' may comprise barium sulfate (barium, or Ba, has an atomic number of 56), while sublayer 144' may comprise bismuth oxide (bismuth, or Bi, has an atomic number of 83). Of course, other arrangements of sublayers 142', 144', etc., are also within the scope of the present invention.

The use of multiple sublayers 142', 144', etc., may provide a radio-opaque layer 140' an increased attenuation over the use of a single layer of radio-opaque material of the same thickness as radio-opaque layer 140'. When superimposed sublayers 142', 144', etc., of different radio-opaque materials are used, selection of the radio-opaque material for each sublayer 142', 144' may be based upon the arrangements of their attenuating species (e.g., lattice structures, the distances their attenuating species are spaced apart from one another, etc.), as sublayers 142' and 144' with differently arranged attenuating species may attenuate ionizing radiation differently. The material or materials of each sublayer 142', 144' may be selected on the basis of their ability to attenuate ionizing radiation over different bandwidths (or ranges) of frequencies or wavelengths, which may impart the radio-opaque layer 140' with the ability to attenuate a broader bandwidth of frequencies of ionizing radiation than the use of a single layer of radio-opaque material that has the same thickness as radio-opaque layer 140'.

Suitable processes, such as those described in reference to the embodiment of radio-opaque film 32' shown in FIG. 7, may be used to manufacture an attenuating element 32" with two or more adjacent sublayers 142', 144', etc. Of course, the use of a plurality of sublayers 142', 144', etc., to form the radio-opaque film 140' requires slight modification of the above-described process, as only the first sublayer 142' is formed directly on the containment layer 120; each successively formed sublayer 144', etc., is formed on a previously formed sublayer 142', etc. Once all of the sublayers 142', 144', etc., are formed, the other containment layer 130 may then be positioned over and applied to the uppermost sublayer 144', etc.

FIG. 9 illustrates another embodiment of attenuating element 32''', in which adjacent sublayers 142', 144', etc., of the radio-opaque layer 140' are physically separated from one another by way of an isolation layer 150. Isolation layer 150 may comprise a polymer, such as a low density polyethylene, or any other suitable material. Isolation layer 150 may itself have radio-opaque properties, or it may be substantially transparent to ionizing radiation.

Attenuating element 32''' may be manufactured by processes similar to those used to form attenuating element 32', with each isolation layer 150 being positioned over and secured to a sublayer 142', etc. (e.g., by roll calendaring, etc.), then forming each successive sublayer 144', etc., on an isolation layer 150. After defining the uppermost (or outermost) sublayer 144', etc., a containment layer 130 is positioned over and secured to that sublayer 144', etc.

Optionally, one or more attenuating elements 32 may include a polymer film that carries an attenuating material (e.g., in the form of particles, films, foils, etc.) on its surface.

EXAMPLE 1

A study was performed to determine the extent to which a radiation shield with two different attenuation elements (layers) will attenuate ionizing radiation. In that study, the attenuation of different amounts of ionizing radiation by a variety of different attenuating elements was determined.

Four different types of radiation shields were prepared and tested for comparative, or reference, purposes. These radiation shields included lead foil, a lead radiation shield, a lead-free radiation shield and a bismuth oxide radiation shield. The lead foil used in the study was 99.9% pure foil available from Alfa Aesar. The lead shield, which had a thickness of 1.5 mm, was a 0.5 mm lead-equivalent STARLITE radiation shield (Lot #10166) available from Bar Ray Products of Littlestown, Pa. The lead-free shield, which included particles of elemental antimony (Sb) embedded in an elastomeric material at a weight ratio of about 1:1 and had a thickness of 1.9 mm (equivalent to 0.5 mm thick lead foil), was a TRUE LITE radiation shield (Lot#10467) available from Bar Ray Products. The bismuth oxide radiation shield included a 0.75 mm thick layer of bismuth oxide captured between two sheets, each about 0.1 mm thick, of TYVEK® flashspun polyethylene fibers.

Three sets of five irradiations were performed, with a first set including 60 kVp of x-ray irradiation, a second set including 90 kVp of x-ray irradiation and a third set including 120 kVp of x-ray irradiation. NANODOT® dosimeters, available from Landauer, Inc., of Glendale, Ill., were used to detect the amount of x-ray radiation that passed through each of the tested products. In each irradiation, five dosimeters were placed on a surface within an anticipated field of exposure having a diameter of about 250 mm. A sample of each of the four radiation shields (i.e., the lead film, the lead shield, the lead-free shield and the bismuth oxide shield) was placed over one of the dosimeters (a total of four dosimeters having been covered). Another dosimeter remained uncovered. A National Institute of Standards and Technology (NIST)- and ISO-calibrated x-ray source available at Landauer's laboratory was used to simultaneously expose the radiation shields and the exposed dosimeter to x-ray radiation. One of the predetermined x-ray energies was then generated, with the tested radiation shields, as well as the bare dosimeter, within the field of exposure. An ion chamber was used to measure the radiation dosage at the beginning of each of the tests (i.e., different energies). Ion chamber counts were obtained three times to verify reproducibility of the measurements. In each test (i.e., for each energy of x-ray radiation), exposure to the x-ray radiation lasted for 60 seconds.

Following each irradiation, the dosimeters were removed and stored carefully to maintain traceability. Data was then obtained from the dosimeters to determine the measured incident dosages of x-ray radiation (the control provided by the bare dosimeters) and the transmitted dosages of x-ray radiation (the amounts of x-ray radiation attenuated by each product, as measured by the covered dosimeters).

Figure 10:
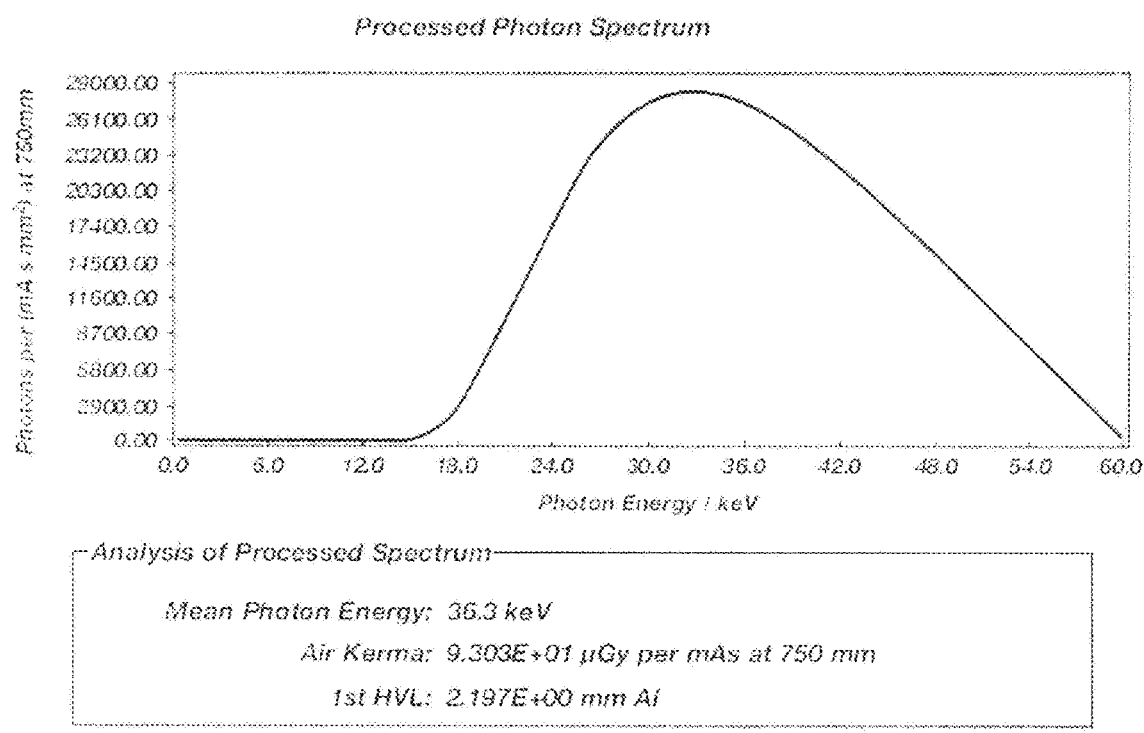
FIGS. 10 through 12 show x-ray energy spectra at 60 kVp, 90 kVp and 120 kVp, respectively.
Figure 11:
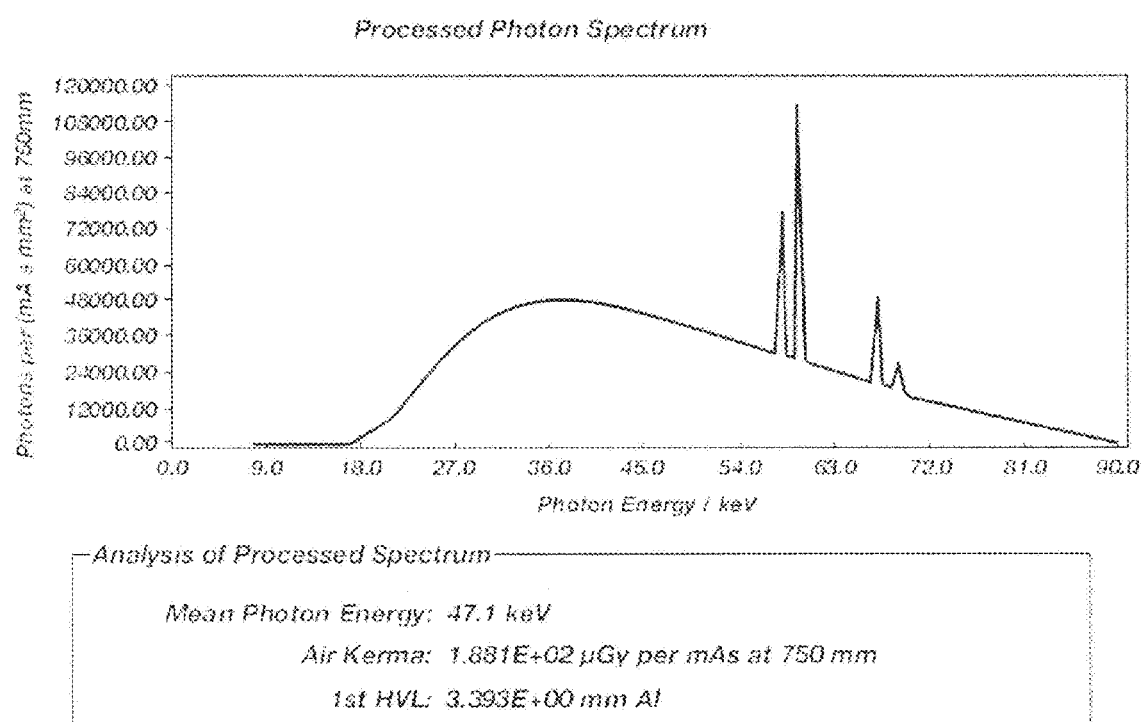
Figure 12:
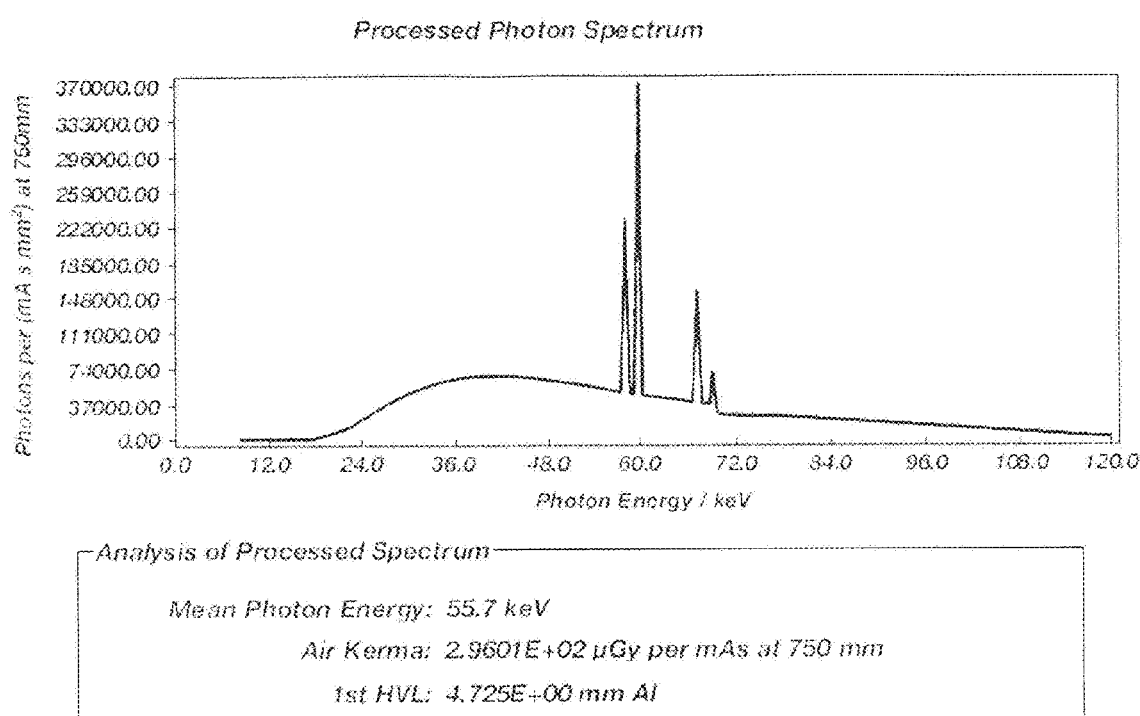

FIGS. 10-12 show the x-ray energy spectra at 60 kVp, 90 kVp and 120 kVp, respectively. In TABLE 1, data corresponding to the dosage of x-ray radiation, measured in mrad, to which each dosimeter (i.e., the bare dosimeter, the dosimeter under the 0.75 mm test product ("Drape"), the dosimeters under the three comparative products "Lead Foil," "Lead Free," "Lead Shield") was exposed is set forth. Each value comprises an average of the five replicate tests at each energy (kVp) of x-ray radiation.

TABLE 1

| KVp | Shielding | Read Ave mrad | StdDev of Read mrad | Energy Adjusted Dose (mrem) | StdDev of Energy Adjusted Dose |
|---|---|---|---|---|---|
| 60 | Bare | 253 | 7 | 243 | 7 |
|  | Bismuth Oxide | 28 | 2 | 27 | 1 |
|  | Lead Foil | 9 | 1 | 8 | 1 |
|  | Lead Free | 17 | 1 | 16 | 1 |
|  | Lead Shield | 11 | 1 | 10 | 1 |
| 90 | Bare | 533 | 10 | 537 | 10 |
|  | Bismuth Oxide | 100 | 4 | 101 | 4 |
|  | Lead | 30 | 1 | 30 | 1 |
|  | Lead Foil | 19 | 1 | 19 | 1 |
|  | Lead Free | 57 | 1 | 58 | 1 |
| 120 | Bare | 850 | 8 | 824 | 8 |
|  | Bismuth Oxide | 203 | 5 | 197 | 5 |
|  | Lead Foil | 31 | 1 | 30 | 1 |
|  | Lead Free | 129 | 3 | 125 | 3 |
|  | Lead Shield | 61 | 2 | 59 | 2 |

From these data, the amount of attenuation by each radiation shield was calculated using attenuation by the 0.5 mm lead foil ("Lead Foil") as a baseline. Specifically, the transmitted mrad values for the other radiation shields were divided by the transmitted mrad values for the 0.5 mm lead foil. The percent (%) attenuation was then calculated as the complement of the quotient.

The 0.5 mm lead foil attenuates x-ray radiation better than the other radiation shields. In decreasing order of x-ray attenuation ability were the 1.5 mm lead shield (98%), the 1.9 mm lead-free shield (92%) and the much thinner 0.75 mm bismuth oxide radiation shield (about 85%).

The same irradiation tests were performed using a radiation shield that included a 0.7 mm thick bi-layer made of two radio-opaque materials: a 0.35 mm thick bismuth oxide layer (80% w/w bismuth oxide, 20% w/w binder (see EXAMPLE 1); and a 0.35 mm thick bismuth-bismuth oxide layer (80% w/w bismuth-bismuth oxide, including 50% w/w bismuth and 50% w/w bismuth oxide, with the balance comprising a binder including PVB, PEG, PVC, silicone and polyurethane. Both radio-opaque films included two sheets (about 0.1 mm thick) of TYVEK® flashspun polyethylene fibers with a radio-opaque layer therebetween. The ability of that radiation shield, which is designed as "2L BB" in TABLE 2 below, to attenuate ionizing radiation at each of the 60 kVp, 90 kVp and 120 kVp x-ray energy spectra, is set forth in TABLE 2.

TABLE 2

| kVp | Shielding | Read Average mrad | Standard Deviation of Delivered mrad | Energy Adjusted Dose (mrem) | Std Deviation of mrem |
|---|---|---|---|---|---|
| 60 | 2L BB | 13 | 0.68 | 12 | 0.73 |
|  | Bare | 254 | 10.5 | 244 | 10.08 |
| 90 | 2L BB | 49 | 1.95 | 50 | 1.97 |
|  | Bare | 542 | 13.91 | 546 | 14.02 |
| 120 | 2L BB | 114 | 5.31 | 111 | 5.15 |
|  | Bare | 836 | 14.73 | 811 | 14.29 |

Figure 13:
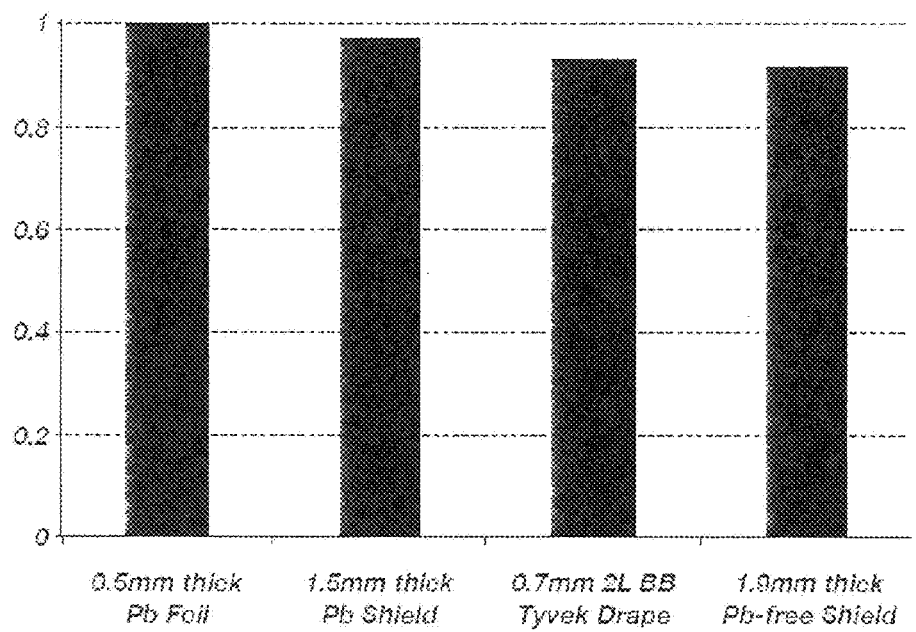
FIG. 13 is a graph depicting the degree to which an embodiment of radio-opaque film of the present invention attenuates ionizing radiation relative to various other radio-opaque materials.

FIG. 13 illustrates the ability of the 0.7 mm radiation shield, which includes two attenuating elements (e.g., layers) to attenuate ionizing radiation relative to the 0.5 mm thick lead foil, the 1.5 mm thick lead-based radio-opaque layer, and the 1.9 mm thick lead-free radio-opaque layer. Based on the data illustrated in FIG. 13, the estimated weight of a frontal radiation shield (based on the 5,000 cm² area of radio-opaque material used in some commercially available frontal radiation shields) made from a 0.7 mm radio-opaque film was calculated, and compared with the known weight of lead frontal radiation shield of the same size.

Figure 14:
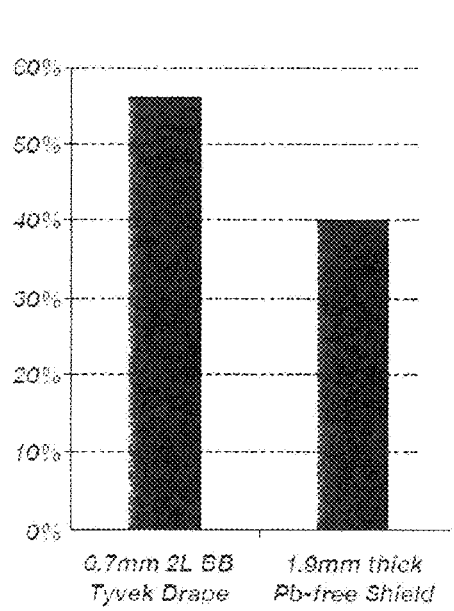
FIG. 14 is a graph depicting an example of the weight savings that may be achieved by using a radio-opaque film of the present invention in a frontal radiation shield, relative to the weight of a commercially available lead-free frontal radiation shield; and The graph of FIG. 15 depicts an example of the weight savings that may be achieved when a radio-opaque film of the present invention is used to manufacture a radiation-blocking garment, as compared with the expected weight of a garment manufactured from a commercially available lead-free material.
Figure 15:
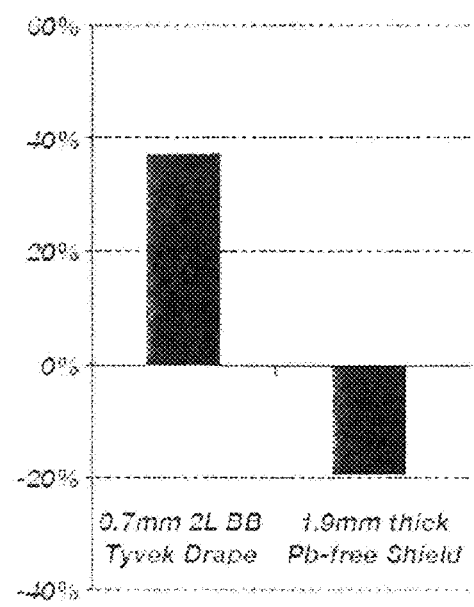

In FIG. 14, the weight savings that would be provided by a frontal radiation shield made from a 0.7 mm thick radiation shield including two attenuating elements (e.g., layers) is depicted in terms of a percent weight savings, as is the amount of weight savings of a lead-free frontal radiation shield over a lead frontal radiation shield. FIG. 15 shows that a complete gown (about 10,000 cm² total area) made from the 0.7 mm radio-opaque film would still weight significantly less (about 35% less) than the combined weights of a lead frontal radiation shield and sterile gown made from sheets of TYVEK® flashspun polyethylene fibers. In contrast, a gown fashioned from the 1.9 mm lead-free radio-opaque material would weight significantly more (about 20% more) than the combined weights of a lead frontal radiation shield and sterile gown.

From the foregoing, it is apparent that a radiation shield that incorporates teachings of this disclosure may attenuate ionizing radiation to an extent comparable to the extents to which existing radiation shields attenuate ionizing radiation, but at a significantly reduced thickness and weight.

EXAMPLE 2

A dose attenuation study was performed to determine the extent to which a radiation shield with two different attenuation elements (layers) will attenuate ionizing radiation in an operating nuclear power plant. The radiation shield used in the study included twenty-five (25) superimposed layers of barium sulfate particles dispersed in vinyl with a percent solids loading of about eighty percent (80%), by weight, to about eighty-two percent (82%), by weight. In addition, that radiation shield included one (1) layer of bismuth oxide particles dispersed in vinyl with a percent solids loading of about eighty-five percent (85%), by weight, to about eighty-seven percent (87%), by weight. The bismuth oxide layer was superimposed over the stack of twenty-five (25) barium sulfate layers, on a side of the stack intended to face away from a source of ionizing radiation. The performance of the barium sulfate-bismuth oxide radiation shield was compared with the abilities of a conventional lead wool shield and of a conventional shield made with tungsten particles to attenuation ionizing radiation. These radiation shields (in the form of shielding blankets) were approximately of the same size and weight as one another.

In this study, two different types of radiation sources were used: (i) a low dose rate source of mixed radiation of a type that may be present in certain locations at a nuclear power plant; and (ii) a high dose rate source comprised essentially of a Cobalt-60 isotope. Two different types of dose detectors were also used: (i) a survey meter using a Geiger-Muller type detector was used to obtain data from a first series of tests using a low dose rate source; and (ii) a more accurate ion chamber detector was used to obtain data from a second series of tests using a low dose rate source and to obtain data from a third series of tests using a high dose rate source.

Each radiation shield was tested by placing it on a source and measuring the amount of ionizing radiation that passed through the shield. The results are tabulated in TABLE 3.

TABLE 3

|  | Geiger Muller detector (Survey Meter) | | Ion Chamber detector | | | |
| --- | --- | --- | --- | --- | --- | --- |
|  | low dose rate, mRem/Hr | Attenuation % | low dose rate, mRem/Hr | Attenuation % | high dose rate, mRem/Hr | Attenuation % |
| No shielding | 39 | — | 18 | — | 600 | — |
| Lead wool blanket | 10 | 74% | 7 | 61% | 260 | 57% |
| Tungsten blanket | 21 | 46% | 12 | 33% | 380 | 37% |
| $BaSO_4/Bi_2O_3$ layered Blanket | 11 | 72% | 8 | 56% | 300 | 50% |

The data clearly show that the dose reduction achieved by the layered low Z/high Z blanket greatly surpasses that of the tungsten shielding blanket and is, in fact, close to that of lead blankets. The data also show this holds true regardless of whether employed in a low or high dose rate environment, and whether measured by a survey meter or an ion chamber detector.

Teachings of this disclosure are not only applicable to radiation shields 30 (FIG. 1) that include two or more attenuating elements 32 that include different attenuating materials from one another, that attenuate different energies or different energy ranges from one other or that have different characteristics from each other, they are also applicable to situations where two or more radiation shields having different characteristics are used together. Without limitation, such a radiation shielding system may include two or more separate layers that are used together to provide the benefits of the disclosed arrangements. Alternatively, a radiation shielding system may include the use of a radiation shield that comprises a tape, a film or the like in conjunction with a pliable or flowable radiation shield (e.g., a resin, putty, paint, etc.). A radiation shielding system may also include two or more layers of different pliable or flowable radiation shields that are used together and are superimposed over one another. Of course, other combinations of radiation shields that attenuate radiation in the disclosed manner are also within the scope of this disclosure.

Although the foregoing description includes many specifics, these should not be construed as limiting the scope of any of the appended claims, but merely as providing information pertinent to some specific embodiments that may fall within the scopes of the appended claims. Other embodiments may also be devised which lie within the scopes of the appended claims. Features from different embodiments may be employed in combination. The scope of each claim is, therefore, indicated and limited only the language of that claim and its legal equivalents. All additions, deletions and modifications to the disclosed embodiments that fall within the meanings and scopes of the appended claims are to be embraced thereby.

The invention claimed is:

1. A radiation shield comprising a radiation attenuating layer, comprising:
   a first sublayer comprising a first radiation attenuating material comprising a salt of a first elemental species having a first atomic number; and
   a second sublayer comprising a second radiation attenuating material comprising a salt of a second elemental species having a second atomic number, the second atomic number being higher than the first atomic number;
   wherein the radiation attenuating material of the first sublayer differs from the radiation attenuating material of the second sublayer, and wherein all the radiation attenuating materials in the radiation attenuating layer are salts of an elemental species.

2. The radiation shield of claim 1, wherein the first sublayer is configured to attenuate incident ionizing radiation emanating from a source of ionizing radiation, and the second sublayer is configured to attenuate secondary ionizing radiation emanating from the first sublayer.

3. The radiation shield of claim 1, wherein the first sublayer is configured to attenuate a first range of energies of ionizing radiation, and the second sublayer is configured to attenuate a second range of energies of ionizing radiation.

4. The radiation shield of claim 3, wherein the first range of energies of ionizing radiation are higher in energy than the second range of energies of ionizing radiation.

5. The radiation shield of claim 1, wherein the first radiation attenuating material is configured to attenuate ionizing radiation over a first bandwidth of frequencies or wavelengths, the second radiation attenuating material is configured to attenuate ionizing radiation over a second bandwidth of frequencies or wavelengths, and the first bandwidth and the second bandwidth differ from one another.

6. The radiation shield of claim 1, wherein the first sublayer comprises one of the following: barium species, bismuth species, and lanthanum species.

7. The radiation shield of claim 1, wherein the first sublayer comprises barium sulfate and the second sublayer comprises bismuth oxide.

8. The radiation shield of claim 1, wherein all the radiation attenuating materials in the radiation attenuating layer are salts of an elemental species having an atomic number of 50 or greater.

9. The radiation shield of claim 8, wherein all the radiation attenuating materials in the radiation attenuating layer are salts of an elemental species having an atomic number of 56 or greater.

10. The radiation shield of claim 1, wherein the first sublayer is configured to be positioned closer to a source of ionizing radiation than the second sublayer.

11. A radiation shield comprising a radiation attenuating layer, comprising:
    a first sublayer comprising a first radiation attenuating material comprising a salt of a first elemental species having a first atomic number; and
    a second sublayer comprising a second radiation attenuating material comprising a salt of a second elemental species having a second atomic number, the second atomic number being higher than the first atomic number;
    wherein the first sublayer is configured to attenuate a first range of energies of ionizing radiation and the second sublayer is configured to attenuate a second range of energies of ionizing radiation, and wherein all the radiation attenuating materials in the radiation attenuating layer are salts of an elemental species.

12. The radiation shield of claim 11, wherein the first sublayer is configured to attenuate incident ionizing radiation emanating from a source of ionizing radiation, and the second sublayer is configured to attenuate secondary ionizing radiation emanating from the first sublayer.

13. The radiation shield of claim 11, wherein the first range of energies of ionizing radiation are higher in energy than the second range of energies of ionizing radiation.

14. The radiation shield of claim 11, wherein the first sublayer comprises barium sulfate and the second sublayer comprises bismuth oxide.

15. The radiation shield of claim 11, wherein all the radiation attenuating materials in the radiation attenuating layer are salts of an elemental species having an atomic number of 50 or greater.

16. The radiation shield of claim 11, wherein the first sublayer is configured to be positioned closer to a source of ionizing radiation than the second sublayer.

17. The radiation shield of claim 11, wherein the radiation attenuating material of the first sublayer differs from the radiation attenuating material of the second sublayer.

18. A method for attenuating ionizing radiation, comprising:
    positioning a radiation shield between a source of ionizing radiation and a subject to be shielded from the ionizing radiation, the radiation shield comprising a radiation attenuating layer, comprising:
        a first sublayer comprising a first radiation attenuating material comprising a salt of a first elemental species having a first atomic number; and
        a second sublayer comprising a second radiation attenuating material comprising a salt of a second elemental species having a second atomic number, the second atomic number being higher than the first atomic number;
    wherein the first sublayer is configured to attenuate incident ionizing radiation emanating from the source of ionizing radiation, and the second sublayer is configured to attenuate secondary ionizing radiation emanating from the first sublayer, and wherein all the radiation attenuating materials in the radiation attenuating layer are salts of an elemental species; and
    orienting the radiation shield such that the first sublayer is closer to the source of ionizing radiation than the second sublayer.

19. The method of claim 18, wherein the first sublayer comprises barium sulfate and the second sublayer comprises bismuth oxide.

20. The method of claim 18, wherein the radiation attenuating material of the first sublayer differs from the radiation attenuating material of the second sublayer.

* * * * *